United States Patent [19]
Mills et al.

[11] Patent Number: 5,921,609
[45] Date of Patent: Jul. 13, 1999

[54] SHADE ASSEMBLY FOR GOLF CARTS

[76] Inventors: Irene B. Mills; Paul R. Mills, both of 1600 Night Wind Dr., Las Vegas, Nev. 89117

[21] Appl. No.: 08/794,327

[22] Filed: Feb. 3, 1997

[51] Int. Cl.⁶ ........................................................ B60J 3/02
[52] U.S. Cl. ............................ 296/138; 296/97.1; 296/83; 160/330; 160/370.21
[58] Field of Search .......................... 296/83, 77.1, 97.1, 296/97.7, 97.9, 79, 138, 143, 97.8; 280/DIG. 5; 135/117; 160/370.22, 330, 370.21, 382, 388, DIG. 3, DIG. 4

[56] References Cited

U.S. PATENT DOCUMENTS

| | | |
|---|---|---|
| 624,066 | 5/1899 | Mitchell . |
| 1,281,571 | 10/1918 | Holt . |
| 1,441,487 | 1/1923 | Doner . |
| 1,442,255 | 1/1923 | Doner . |
| 1,468,115 | 9/1923 | Kivikink et al. . |
| 1,500,022 | 7/1924 | Woodward . |
| 1,526,346 | 2/1925 | Kivikink . |
| 1,569,118 | 1/1926 | Curtis . |
| 1,626,997 | 5/1927 | Wragg . |
| 1,735,699 | 11/1929 | Shelton . |
| 1,738,442 | 12/1929 | Meader . |
| 1,932,475 | 10/1933 | Peteler . |
| 2,793,050 | 5/1957 | Cook ........................................ 280/150 |
| 2,927,819 | 3/1960 | Johnson . |
| 3,709,553 | 1/1973 | Churchill et al. ................... 280/DIG. 5 |
| 4,013,315 | 3/1977 | West ........................................ 296/83 |
| 4,428,412 | 1/1984 | Toro .................................. 160/DIG. 3 |
| 4,707,018 | 11/1987 | Gavagan ............................... 296/97.6 |
| 4,825,891 | 5/1989 | Machado ............................. 135/117 X |
| 5,010,941 | 4/1991 | Ross, Sr. et al. ........................ 160/330 |
| 5,098,149 | 3/1992 | Lee .......................................... 296/97.6 |
| 5,362,119 | 11/1994 | Rosentratter ........................... 296/97.8 |
| 5,388,881 | 2/1995 | Spencer et al. ......................... 296/77.1 |
| 5,393,118 | 2/1995 | Welborn ................................. 296/77.1 |
| 5,509,713 | 4/1996 | Hou ......................................... 296/138 |
| 5,588,690 | 12/1996 | Showalter .............................. 296/77.1 |
| 5,788,317 | 8/1998 | Nation ..................................... 296/141 |

*Primary Examiner*—Joseph D. Pape
*Attorney, Agent, or Firm*—Joseph N. Breaux

[57] ABSTRACT

A shade assembly including a flexible shade member having a tubular mounting sleeve along a top edge thereof, the mounting sleeve being of a first length; a mounting tube having a longitudinal mounting rod pathway formed through the length thereof and an outer mounting tube diameter sized to allow the mounting tube to snugly fit through the mounting sleeve, the mounting tube being of a tube length equal to the first length of the mounting sleeve; a mounting rod having a mounting rod length at least four inches longer than the tube length of the mounting tube, the mounting rod having a first threaded end portion having a first threaded end portion length of at least four inches and a second threaded end portion having a second threaded end portion length of at least four inches, the mounting rod having an outer diameter sized to allow insertion of the mounting rod through the mounting rod pathway of the mounting sleeve and allow the mounting tube to spin about the mounting rod; a first mounting tube positioning nut companionately threaded with the first threaded end portion of the mounting rod; and a second mounting tube positioning nut companionately threaded with the second threaded end portion of the mounting rod. The mounting tube is positionable along the mounting rod by adjusting the position of the first and second mounting tube positioning nuts.

8 Claims, 3 Drawing Sheets

SHADE ASSEMBLY FOR GOLF CARTS

TECHNICAL FIELD

The present invention relates to sun and wind screening devices and more particularly to a shade assembly for golf carts that includes a non-sliding flexible shade member mounted onto a user positionable shade mounting tube. The shade mounting tube is securable in a desired location along a threaded mounting rod by and between a pair of mounting tube positioning nuts. The shade member is provided with companionate hook and pile fastening sections in opposed corners of one side surface thereof that are attachable together to hold the shade member in a folded configuration.

BACKGROUND OF THE INVENTION

Golf carts often have open sides and, therefore, expose the occupants of the passenger compartment of the golf cart to rain, sun and wind. It would be desirable, therefore, to have a shade assembly that included a flexible shading member that would be secured to the roof support frame of a golf cart that could be deployed over a portion of the open side of a golf cart to shield the occupants, from sun rays, rain and wind. Because, the shading member is not required during some weather condition, it would be a further benefit to have a shading assembly that included a flexible shading member that could be stored out of the way when not needed. Further, because only a portion of the side of the golf cart may require shading, it would be a still further benefit to have a shading assembly that included a flexible shade member that was installed onto a shade support in a manner to prevent sliding of the shade member with respect to the shade support and that allowed the shade support to be moved and held in position across a desired section of the golf cart side.

SUMMARY OF THE INVENTION

It is thus an object of the invention to provide a shade assembly for golf carts that includes a flexible shading member that can secured to the roof support frame of a golf cart that can be deployed over a portion of the open side of a golf cart to shield the occupants, from sun rays, rain and wind.

It is a further object of the invention to provide a shade assembly for golf carts that includes a flexible shading member that can be rolled up and secured about a spinnable mounting tube for storage out of the way when not needed without detaching the shading member from its support.

It is a still further object of the invention to provide a shade assembly for golf carts that includes a flexible shade member that is installed onto a shade mounting tube in a manner to prevent sliding of the shade member with respect to the shade mounting tube and that allows the shade mounting tube to be moved and held in position across a desired section of the golf cart side.

It is a still further object of the invention to provide a shade assembly for golf carts that some or all of the above objects in combination.

Accordingly, a shade assembly for golf carts is provided. The shade assembly includes a flexible shade member having a tubular mounting sleeve along a top edge thereof, the mounting sleeve being of a first length; a mounting tube having a longitudinal mounting rod pathway formed through the length thereof and an outer mounting tube diameter sized to allow the mounting tube to snugly fit through the mounting sleeve, the mounting tube being of a tube length equal to the first length of the mounting sleeve; a mounting rod having a mounting rod length at least four inches longer than the tube length of the mounting tube, the mounting rod having a first threaded end portion having a first threaded end portion length of at least four inches and a second threaded end portion having a second threaded end portion length of at least four inches, the mounting rod having an outer diameter sized to allow insertion of the mounting rod through the mounting rod pathway of the mounting sleeve and allow the mounting tube to spin about the mounting rod; a first mounting tube positioning nut companionately threaded with the first threaded end portion of the mounting rod; and a second mounting tube positioning nut companionately threaded with the second threaded end portion of the mounting rod. The position of the mounting tube along the mounting rod is adjustable by positioning the first mounting tube positioning nut at a desired end location, positioning one end of the mounting tube against the first mounting tube mounting nut and then positioning the second mounting tube mounting nut against the opposite edge of the mounting tube. The screen member can be stored out of the way when no needed by loosening the first and second positioning nuts sufficiently to allow the mounting tube to spin about the mounting rod, spinning the mounting tube until the shade member is wound about the mounting tube, and then tightening the first and second positioning nuts sufficiently to prevent the mounting tube form spinning relative to the mounting rod.

In a preferred embodiment the bottom edge of the shade member is formed into a weight receiving pocket and weights are positioned within the weight receiving pocket. In another preferred embodiment, an L-shaped mounting bracket is provided for facilitating mounting of the mounting rod to the golf cart frame. In still another preferred embodiment the shade member has a first rectangular surface defined by a first perimeter and the first rectangular surface has a first section of hook and pile fastener material secured adjacent a first corner of the first perimeter and a second section of hook and pile material positioned adjacent to a second corner of the first perimeter, the first corner being opposite the second corner, the first and second sections of hook and pile material being companionate sections that form an attachment upon contact.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
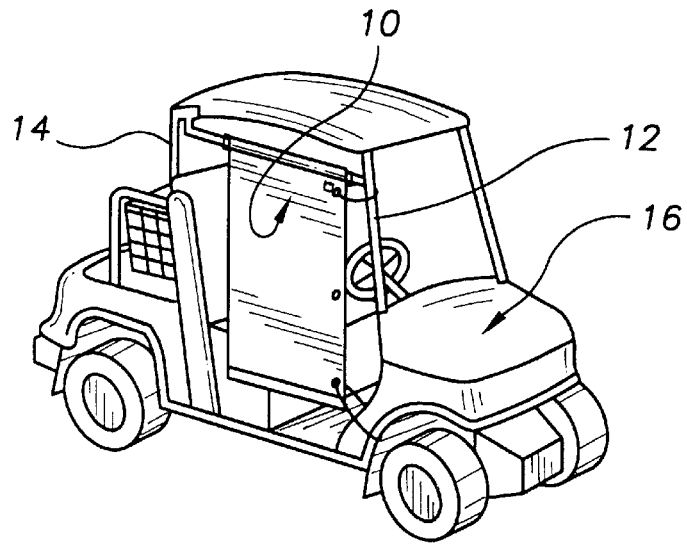
FIG. 1 is a perspective view of an exemplary embodiment of the shade assembly for golf carts of the present invention with the threaded mounting rod installed between two roof supports of a representative golf cart.
Figure 2:
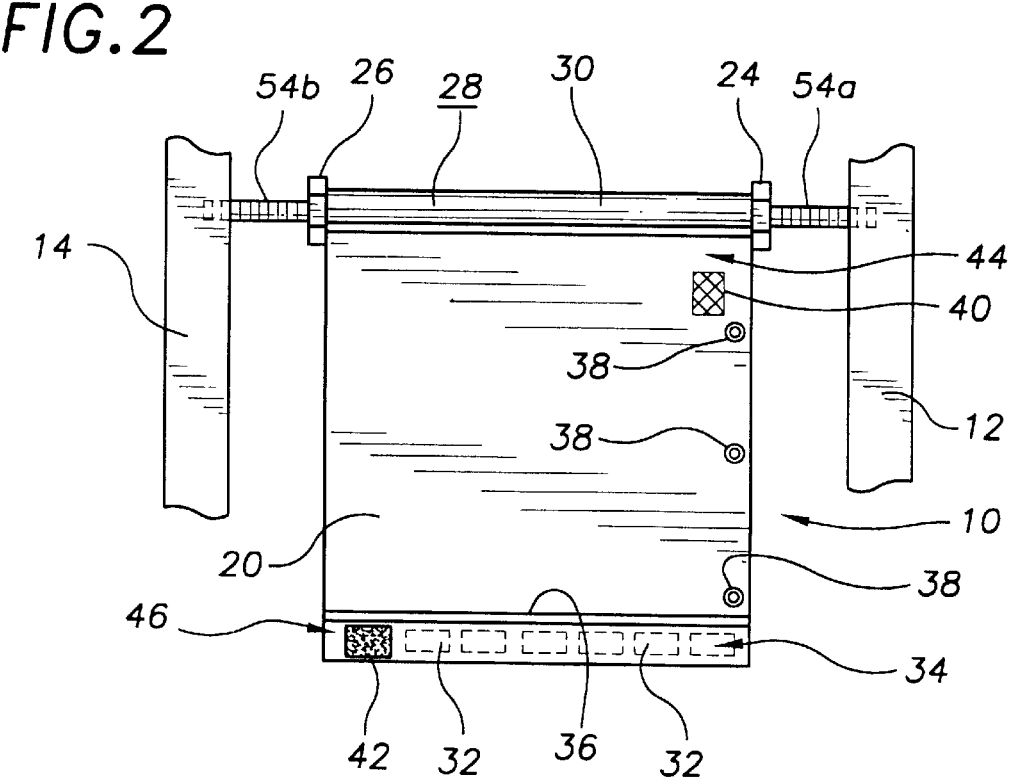
FIG. 2 is a plan view of the exemplary shade assembly of FIG. 1 showing the flexible shade member including the tubular mounting sleeve formed along a top edge of the sleeve member, the weights stitched into the weight receiving pocket formed along the bottom edge of sleeve member, the five grommets positioned along the edges of the sleeve member, and the first and second sections of companionate hook and pile material provided in opposed corners of one surface of the screen member; the first and second mounting tube positioning nuts; and the mounting rod including the first and second threaded end portions thereof.

FIG. 1 shows an exemplary embodiment of the shade assembly for golf carts of the present invention, generally designated by the numeral 10, installed between two roof supports 12, 14 of a representative golf cart, generally designated by the numeral 16. With reference to FIG. 2, shade assembly 10 includes a rectangular shaped, opaque, flexible plastic shade member 20, a mounting tube 22 (FIG. 3), a first mounting tube positioning nut 24, a second mounting tube positioning nut 26, and a mounting rod 52 (FIG. 4).

Shade member 20 includes a tubular mounting sleeve 28 formed along a top edge 30 of sleeve member 20, a number of plastic weights 32 stitched into a weight receiving pocket 34 formed along a bottom edge 36 of sleeve member 20, five grommets 38 positioned along the side edges of sleeve member 20, a first section 40 of hook and pile material provided in a first corner 44 of one surface of screen member 20, and a second section 42 of hook an pile material companionate with first section 40 is provided in a second corner 46 of screen member 20.

Figure 3:
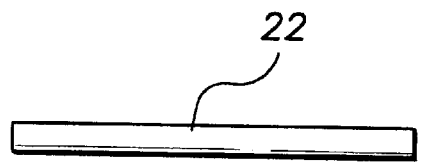
FIG. 3 is a side plan view of the mounting tube in isolation.
Figure 4:
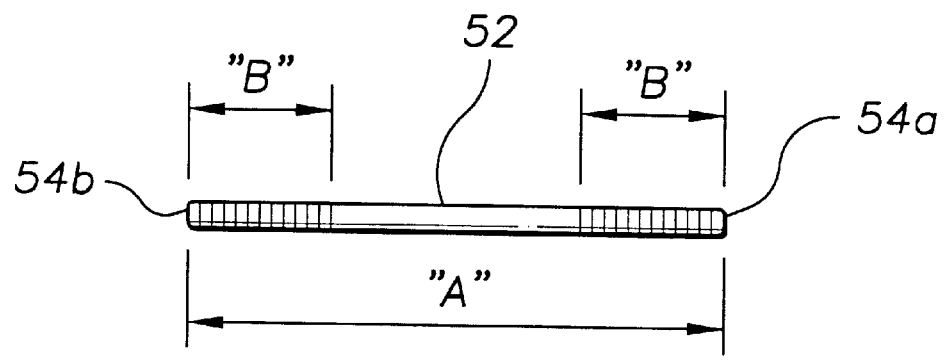
FIG. 4 is a side plan view of the mounting rod in isolation showing the first and second threaded end portions.
Figure 5:
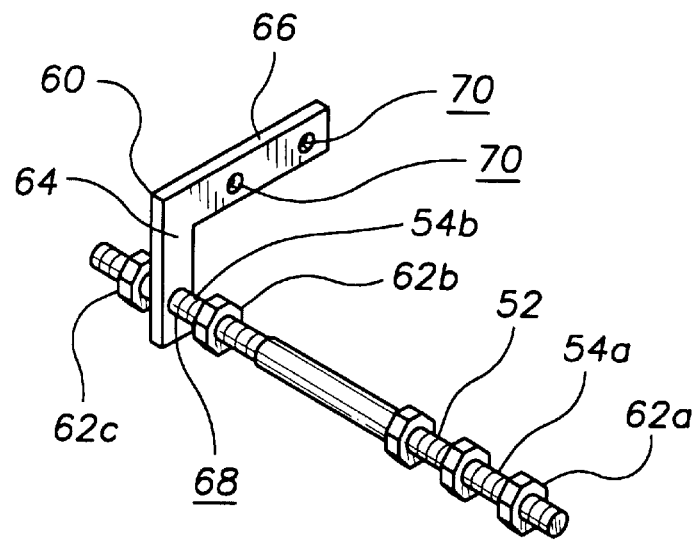
FIG. 5 is a cross sectional view through the line I—I of FIG. 1 showing the mounting rod positioned through the mounting rod pathway of the mounting tube and the mounting tube positioned within the mounting sleeve of the sleeve member.

With reference to FIG. 3, mounting tube 22 is a straight section of aluminum tubing of a length equal to the length of tubular mounting sleeve 28 of sleeve member 20. Mounting tube 22 includes a tubular pathway 50 (FIG. 5) formed through the entire length thereof. With reference to FIG. 4, tubular pathway 50 is provided through mounting tube 22 to allow mounting rod 52 to be inserted therethrough. In this embodiment, mounting rod 52 is a metal rod of a length "A" that is six inches greater than the length of mounting tube 22. Mounting rod 52 has two threaded end portions 54a, 54b of a length "B" measuring six inches in length. Referring now to FIG. 5, when shade assembly 10 is assembled, mounting rod 52 is inserted through tubular pathway 50 of mounting tube 22 and mounting tube 22 is inserted into mounting sleeve 28. Mounting tube 22 has an outer diameter sized to fit tightly within mounting sleeve 28. Mounting rod 52 has an outer diameter selected to allow insertion of mounting rod 52 into tubular pathway 50 and allow rotation of mounting tube 22 about mounting rod 52.

Referring back to FIG. 1, one mounting tube positioning nut 24, 26 is positioned on either side of mounting sleeve 28 and mounting tube 22 (FIG. 5) to position shade member 20 at a desired position relative to golf cart roof supports 12, 14. In addition, shade member 20 can be wound onto mounting tube 22 for storage out of the way when not needed. When wound onto mounting tube 22, shade member 20 is prevented from unwinding by tightening mounting tube positioning nuts 24, 26 against the ends of mounting tube 22 sufficiently to prevent mounting tube 22 from spinning about mounting rod 52.

Figure 6:
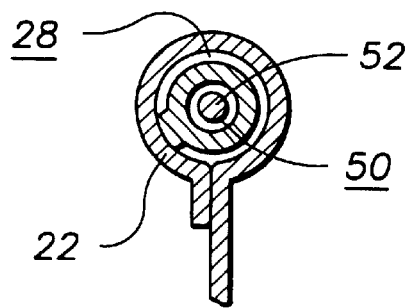
FIG. 6 is a perspective view showing the L-shaped mounting bracket and the three mounting nuts.

FIG. 6 shows an L-shaped, metal, mounting bracket 60, and three mounting nuts 62a, 62b, 62c that are provided with this exemplary shade assembly 10. L-shaped bracket has a short leg 64 and a long leg 66. Short leg 64 is provided with one aperture 68 for receiving a section of one of mounting rod end portions 54a, 54b. Long leg 66 is provided with two mounting apertures 70 for securing long leg 66 to a structure, such as the roof, on golf cart 16. Mounting nuts 62a, 62b, 62c are conventional hexagonal threaded nuts and are used to secure mounting rod 52 between supports 12, 14 if necessary.

Figure 7:
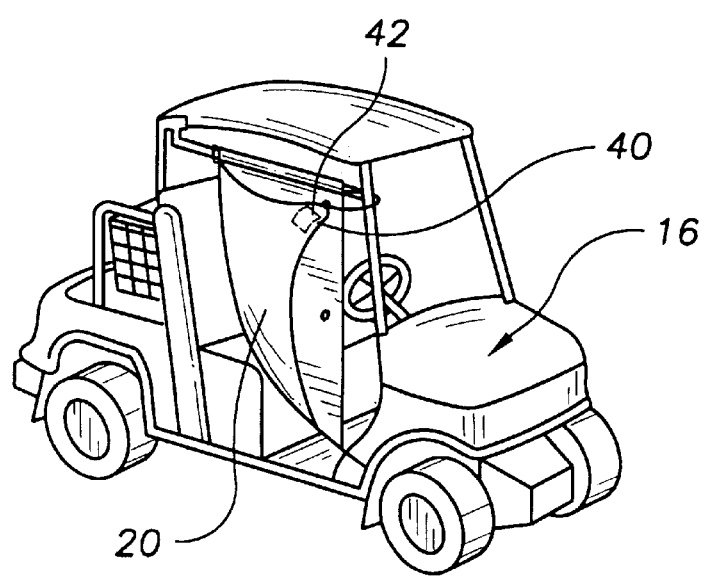
FIG. 7 is a perspective view of the exemplary shade assembly mounted to the representative golf cart showing the L-shaped mounting bracket installed against the back edge of the golf cart roof and the shade member folded diagonally and secured in place with the first and second sections of companionate hook and pile fastener material.

FIG. 7 shows shade member 20 folded diagonally across and secured in position with first and second sections 40, 42.

It can be seen from the preceding description that a shade assembly for golf carts has been provided that includes a flexible shading member that can secured to the roof support frame of a golf cart that can be deployed over a portion of the open side of a golf cart to shield the occupants, from sun rays, rain and wind; that includes a flexible shading member that can be stored out of the way when not needed without detaching the shading member; and that includes a flexible shade member that is installed onto a shade mounting tube in a manner to prevent sliding of the shade member with respect to the shade mounting tube and that allows the shade mounting tube to be moved and held in position across a desired section of the golf cart side.

It is noted that the embodiment of the shade assembly for golf carts described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A shade assembly for golf carts comprising:

a flexible shade member having a tubular mounting sleeve along a top edge thereof, said mounting sleeve being of a first length;

a mounting tube having a longitudinal mounting rod pathway formed through the length thereof and an outer mounting tube diameter sized to allow said mounting tube to snugly fit through said mounting sleeve, said mounting tube being of a tube length equal to said first length of said mounting sleeve;

a mounting rod having a mounting rod length at least four inches longer than said tube length of said mounting tube, said mounting rod having a first threaded end portion having a first threaded end portion length of at least four inches and a second threaded end portion having a second threaded end portion length of at least four inches, said mounting rod having an outer diameter sized to allow insertion of said mounting rod through said mounting rod pathway of said mounting sleeve and allow said mounting tube to spin about said mounting rod when said mounting rod is positioned through said mounting rod pathway;

a first mounting tube positioning nut companionately threaded with said first threaded end portion of said mounting rod; and a second mounting tube positioning nut companionately threaded with said second threaded end portion of said mounting rod.

2. The shade assembly for golf carts of claim 1, wherein:

a bottom edge of said shade member is formed into a weight receiving pocket; and weights are positioned within said weight receiving pocket.

3. The shade assembly for golf carts of claim 1, wherein:

an L-shaped mounting bracket having a short leg and a long leg, said short leg having one aperture formed therethrough, said long leg having two mounting apertures formed therethrough; and three mounting nuts, each mounting nut being companionately threaded with said first and second threaded end portions of said mounting rod.

4. The shade assembly for golf carts of claim 1 further including:

said shade member has a first rectangular surface defined by a first perimeter and said first rectangular surface has a first section of hook and pile fastener material secured adjacent a first corner of said first perimeter and a second section of hook and pile material positioned adjacent to a second corner of said first perimeter, said first corner being opposite said second corner, said first and second sections of hook and pile material being companionate sections that form an attachment upon contact.

5. The shade assembly for golf carts of claim 2, wherein:

an L-shaped mounting bracket having a short leg and a long leg, said short leg having one aperture formed therethrough, said long leg having two mounting apertures formed therethrough; and three mounting nuts, each mounting nut being companionately threaded with said first and second threaded end portions of said mounting rod.

6. The shade assembly for golf carts of claim 2 further including:

said shade member has a first rectangular surface defined by a first perimeter and said first rectangular surface has a first section of hook and pile fastener material secured adjacent a first corner of said first perimeter and a second section of hook and pile material positioned adjacent to a second corner of said first perimeter, said first corner being opposite said second corner, said first and second sections of hook and pile material being companionate sections that form an attachment upon contact.

7. The shade assembly for golf carts of claim 5 further including:

said shade member has a first rectangular surface defined by a first perimeter and said first rectangular surface has a first section of hook and pile fastener material secured adjacent a first corner of said first perimeter and a second section of hook and pile material positioned adjacent to a second corner of said first perimeter, said first corner being opposite said second corner, said first and second sections of hook and pile material being companionate sections that form an attachment upon contact.

8. The shade assembly for golf carts of claim 3 further including:

said shade member has a first rectangular surface defined by a first perimeter and said first rectangular surface has a first section of hook and pile fastener material secured adjacent a first corner of said first perimeter and a second section of hook and pile material positioned adjacent to a second corner of said first perimeter, said first corner being opposite said second corner, said first and second sections of hook and pile material being companionate sections that form an attachment upon contact.

* * * * *